(12) United States Patent
Massie

(10) Patent No.: US 6,220,205 B1
(45) Date of Patent: Apr. 24, 2001

(54) MAT FOR PROTECTING FLOORS IN AN ANIMAL CONFINEMENT PEN

(75) Inventor: Thomas A. Massie, Wahoo, NE (US)

(73) Assignee: Wahoo Concrete Products, Inc., Wahoo, NE (US)

( * ) Notice: Subject to any disclaimer, the term of this patent is extended or adjusted under 35 U.S.C. 154(b) by 0 days.

(21) Appl. No.: 09/275,807

(22) Filed: Mar. 25, 1999

(51) Int. Cl.$^7$ .................................................. A01K 29/00
(52) U.S. Cl. .......................................................... 119/28.5
(58) Field of Search ................................. 119/28.5, 525, 119/526; 15/215, 216, 238

(56) References Cited

U.S. PATENT DOCUMENTS

| | | | |
|---|---|---|---|
| 3,699,926 | * 10/1972 | Stockl | 119/526 |
| 4,211,185 | * 7/1980 | Karlsson | 119/526 |
| 4,333,981 | 6/1982 | Winfield et al. | 428/215 |
| 4,502,415 | 3/1985 | Schwarzkopff et al. | 119/28 |
| 4,955,321 | 9/1990 | Waldner | 119/61 |
| 5,363,806 | 11/1994 | Van Gilst | 119/61 |

FOREIGN PATENT DOCUMENTS

346448 * 1/1905 (FR) ..................................... 119/526

* cited by examiner

*Primary Examiner*—Thomas Price
(74) *Attorney, Agent, or Firm*—Rothwell, Figg, Ernst & Manbeck

(57) ABSTRACT

A mat for protecting a floor in an animal confinement pen. The mat is formed of a durable material which is corrosion and abrasion resistant, impact absorbing, and fluid impermeable, and has a plurality of protrusions disposed on an upper surface of the mat, with the plurality of protrusions being regularly spaced and functioning to provide traction to animals but without accumulating debris on the mat, and also having a plurality of grooves disposed on the upper surface of the mat, with the plurality of grooves being spaced regularly apart and extending between opposite edges of the mat, and having a beveled edge extending around a perimeter of the mat so that animals may not be able to chew on the mat.

19 Claims, 2 Drawing Sheets

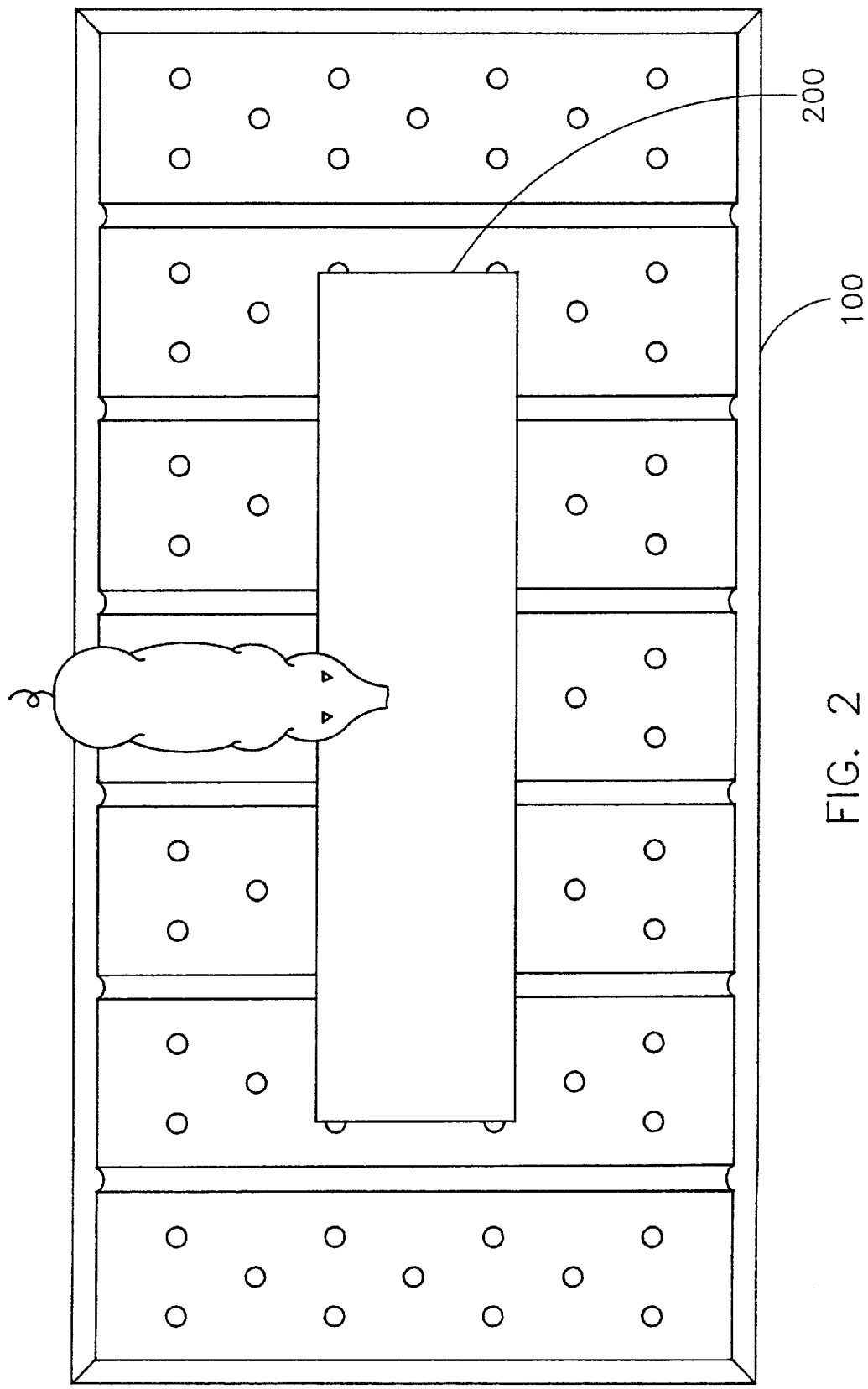

MAT FOR PROTECTING FLOORS IN AN ANIMAL CONFINEMENT PEN

BACKGROUND OF THE INVENTION

1. Field of the Invention

The present invention relates to a mat for protecting a floor in an animal confinement pen.

2. Description of Background Art

Animal confinement pens are commonly used to feed livestock in preparation for market. Confinement pens hold animals in a restricted space where they can be heavily fed in order to promote fast growth. Confinement pens may additionally prevent the animals from fighting or injuring each other, and the close quarters prevents the animals from being too active, which results in an overly muscular and tough food animal.

Confinement pens are commonly constructed with a flooring upon which the animals stand or rest, as a dirt floor in a confinement pen quickly becomes wet or muddy and may be a cause of disease or infection. Therefore, slat floors, having regularly spaced openings, are commonly used to keep the confined animals up off of the ground while yet allowing animal wastes to fall through and be disposed of. Slat floors are commonly constructed of pre-fabricated concrete panels placed together upon a supporting structure.

Confinement pens for animal feeding are used to promote fast growth in the animals. The quantity and quality of the feed can be highly regulated and controlled. As part of the feed mixture, a feedlot operator may add ingredients such as acids, salts, and whey to stimulate appetite and weight gain, and also to increase water consumption and retention by the animals. Although the additives may achieve the desired goals, they have a negative consequence on the floor of the confinement pen. Because the additives have a corrosive effect, especially on concrete, feed spilled on the floor has a deleterious effect on the flooring. The additives cause a softening and crumbling of the concrete.

In the past, feedlot operators had few ways in which to combat such corrosion. Often, the corrosion was simply ignored and the slat flooring was replaced when it had deteriorated too much. Alternatively, raised concrete pads were constructed for feed dispensers to rest on, basically adding more concrete for the corrosion to attack as a way of postponing the problem. Coatings were painted on the flooring that provided a protective layer. Occasionally mats have been used under and around feed dispensers, but not as a protective barrier.

All of these prior art approaches had their drawbacks. Ignoring the problem completely meant that a concrete floor could become dangerous or unusable in the span of a few years. A raised concrete pad lengthened this period by providing more concrete to be corroded before the slat flooring was destroyed, but did nothing to slow or prevent the actual rate of decay. Painted-on coatings were capable of providing an effective barrier to corrosion, but had difficulty in withstanding the wear and tear of animal hooves. Some animals, such as pigs, are very competitive in feeding, and continuously fight for a place at the feed dispenser. The sharp and active hooves of swine will damage a painted-on covering. Rubber mats have been used in order to retain feed, but not to prevent corrosion of the underlying floor. Although rubber mats may protect the underlying floor, they have disadvantages such as being susceptible to wear and abrasion, and can be chewed up by animals. Pigs are notorious for chewing on exposed edges. Hard plastic mats may be tough and abrasion resistant, but may become slippery when wet.

What is needed therefore is a mat of a durable material that is corrosion and abrasion resistant and fluid impermeable that can be used to protect the flooring in an animal confinement pen.

SUMMARY OF THE INVENTION

It is therefore an object of the invention to provide a mat for protecting a floor in an animal confinement pen.

It is another object of the invention to provide a mat for protecting a floor in an animal confinement pen from corrosion.

It is yet another object of the invention to provide an impact and abrasion resistant mat for an animal confinement pen.

It is yet another object of the invention to provide a mat having grooves upon an upper surface for liquid drainage.

It is yet another object of the invention to provide a mat having regular projections upon an upper surface to provide traction for animals.

It is yet another object of the invention to provide a mat having beveled edges so that animals using the mat are prevented from chewing on the mat.

A mat for protecting a floor in an animal confinement pen is provided according to a first embodiment of the invention. The mat is formed of a durable material which is corrosion and abrasion resistant, impact absorbing, and fluid impermeable, having a plurality of protrusions disposed on an upper surface of the mat, with the plurality of protrusions functioning to provide traction to animals but without accumulating debris on the mat, and having a plurality of grooves disposed on the upper surface of the mat, with the plurality of grooves extending between opposite edges of the mat.

A mat for protecting a floor in an animal confinement pen is provided according to a second embodiment of the invention. The mat is formed of a durable material which is corrosion and abrasion resistant, impact absorbing, and fluid impermeable, having a plurality of protrusions disposed on an upper surface of the mat with the plurality of protrusions being regularly spaced and functioning to provide traction to animals but without accumulating debris on the mat, a plurality of grooves disposed on the upper surface of the mat, with the plurality of grooves being spaced regularly apart and extending between opposite edges of the mat, and a beveled edge extending around a perimeter of the mat so that animals may not be able to chew on the mat.

The above and other objects, features and advantages of the present invention will become clear from the following description of the preferred embodiment thereof, taken in conjunction with the accompanying drawings.

BRIEF DESCRIPTION OF THE DRAWINGS

FIG. 2 shows an overhead view of the mat of the present invention illustrating its use.

DETAILED DESCRIPTION OF THE PREFERRED EMBODIMENTS

Figure 1:
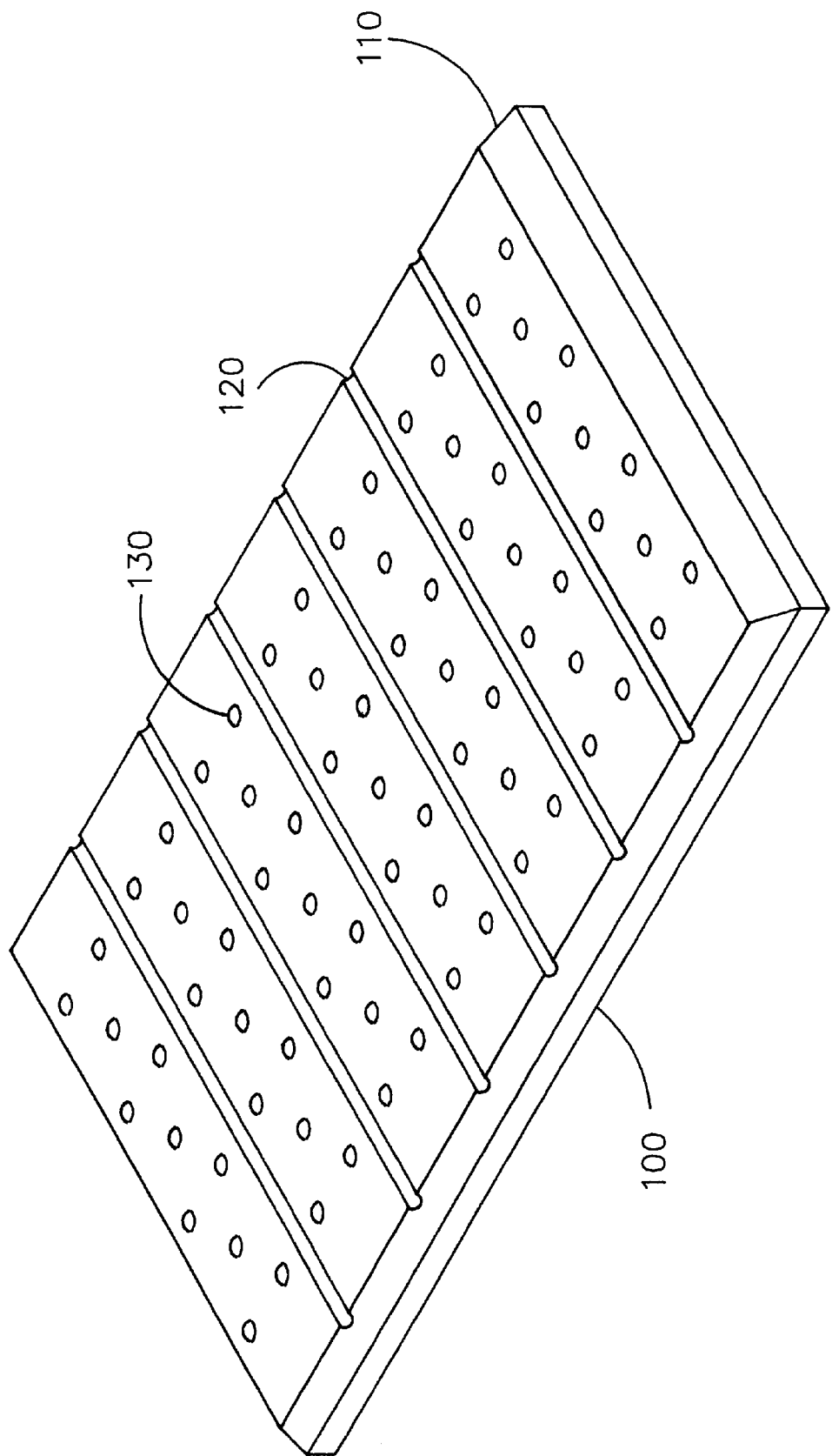
FIG. 1 shows an axonometric view of the mat of the present invention.

Referring now to FIG. 1, there is shown a mat 100 according to the present invention. The mat 100 is of a substantially rectangular shape, although it will be obvious that the perimeter of the mat 100 may be formed to any desired shape, including irregular shapes. In the prefered embodiment, the mat is a rectangular shape of forty-six and three quarters of an inch on a side, although the dimensions are not critical and the mat 100 may be made to any desired size. The perimeter of the mat 100 preferably has a beveled edge 110, and the mat 100 has a plurality of grooves 120 and a plurality of protrusions 130.

The mat 100 is preferably composed of high density polyethylene. Alternatively, the mat 100 may be made from any plastic material that is sufficiently abrasion and corrosion resistant. The beveled edge 110 is formed on the perimeter of the mat 100 in order to prevent chewing by animals. Because pigs have an underbite, a beveled edge makes it very difficult for animals to chew on an edge, and pigs in particular. The thickness of the mat in the preferred embodiment is approximately one half inch, although the mat 100 may range from one quarter inch to one inch in thickness. Thinner or thicker mats can be produced and used where appropriate or desired. In the preferred embodiment, the bevel is at an angle of approximately forty-five degrees, but the angle of the bevel is not critical and may range from, for example, thirty degrees to sixty degrees. The depth of the bevel 110 (i.e., the vertical depth of the material removed) in the prefered embodiment is approximately two-thirds of the thickness of the mat 100, although the depth of the bevel may alternatively range from one quarter of the thickness of the mat 100 to the full thickness of the mat 100.

The grooves 120 are for the purpose of draining liquids from the mat 100, and also serve the purpose of providing traction to animals using the mat 100. The grooves 120 are preferably a series of equally spaced, parallel grooves formed in the mat 100, however, alternatively the grooves 120 may be spaced in different configurations. In the preferred embodiment, the grooves 120 are semi-circular in cross-section, but alternatively the grooves 120 may be of any cross-sectional shape capable of draining liquids from the mat 100. In the preferred embodiment, the grooves 120 have a diameter of approximately seven thirty-seconds of an inch, and occur at a spacing of two and thirteen sixteenths of an inch. It will be obvious to one skilled in the art that the size and spacing of the grooves 120 may be varied according to the desired liquid-carrying capacity.

The protrusions 130 are preferably semi-spherical in shape and extend above the top surface of the mat 100. In the preferred embodiment, the protrusions are approximately one eighth inch in height, with a diameter of seven sixteenths of an inch. The purpose of the protrusions 130 is to provide traction and prevent slipping of animals walking or standing on the mat 100. In an alternative embodiment, the protrusions 130 may be polygonal or irregular in shape. The protrusions 130 are spaced in a regular grid pattern. In the preferred embodiment the spacing of the protrusions 130 alternates between rows, but the pattern disclosed is only one possibility, and the pattern is not critical to the invention.

FIG. 2 shows a mat 100 being used underneath a feed dispenser 200. The mat 100 may be formed of a size that will provide a substantially consistent uncovered portion when the feed dispenser 200 is roughly centered on the mat 100. Preferably, the portion of the mat 100 not under the feed dispenser 200 will be of a size that does not extend to the rear end of an animal using the feed dispenser 200, so that animal waste material will not fall on the mat 100. The mat 100, because it extends a distance from the feed dispenser 200, will catch feed dropped by animals using the feed dispenser 200, and prevent corrosion of the underlying floor due to corrosive materials in the feed by providing a protective barrier between the spilled feed and the floor. As a further protection against curling or lifting of the edges in order to prevent chewing by animals, the mat 100 may optionally be fastened to the floor by bolts, screws, or other appropriate fasteners. Fastening the mat 100 to a floor may also guarantee that the mat 100 remains in position over an area of the floor desired to be protected from corrosion.

While the invention has been disclosed in detail above, the invention is not intended to be limited to the invention as disclosed. It is evident that those skilled in the art may now make numerous uses and modifications of and departures from the specific embodiments described herein without departing from the inventive concepts.

What is claimed is:

1. A mat for protecting a floor in an animal confinement pen, comprising:

a solid mat having an essentially flat upper surface and a flat lower surface, said mat being formed of a durable material which is corrosion and abrasion resistant, impact absorbing, and fluid impermeable;

a plurality of protrusions disposed on an upper surface of said mat, with said plurality of protrusions being semi-hemispherical in shape and functioning to provide traction to animals but without accumulating debris on said mat; and a plurality of grooves disposed on said upper surface of said mat, with said plurality of grooves extending between opposite edges of said mat.

2. The mat of claim 1, wherein said plurality of protrusions and said plurality of grooves are regularly spaced.

3. The mat of claim 1, wherein said mat is substantially centered under a feed trough so that spilled feed is kept up off of a floor under said trough.

4. The mat of claim 1, wherein said mat is sized so that said mat is short of the rear end of an animal eating from a feed dispenser centered on said mat, so that animal wastes may still fall on the floor.

5. The mat of claim 1, wherein said material is a plastic.

6. The mat of claim 1, wherein said material is high density polyethylene.

7. The mat of claim 1, wherein said material is rubber.

8. The mat of claim 1, wherein said grooves are substantially semi-circular in cross-section.

9. The mat of claim 1, wherein said mat is fastened to a floor.

10. The mat of claim 1, wherein a beveled edge extends around a perimeter of said mat so that animals may not be able to chew on said perimeter of said mat.

11. A mat for protecting a floor in an animal confinement pen, comprising:

a solid mat having an essentially flat upper surface and a flat lower surface, said mat being formed of a durable material which is corrosion and abrasion resistant, impact absorbing, and fluid impermeable;

a plurality of protrusions disposed on an upper surface of said mat, with said plurality of protrusions being semi-hemispherical in shape and functioning to provide traction to animals but without accumulating debris on said mat;

a plurality of grooves disposed on said upper surface of said mat, with said plurality of grooves extending between opposite edges of said mat; and a beveled edge extending around a perimeter of said mat so that animals may not be able to chew on said mat.

12. The mat of claim 11, wherein said plurality of protrusions and said plurality of grooves are regularly spaced.

13. The mat of claim 11, wherein said mat is substantially centered under a feed trough so that spilled feed is kept up off of a floor under said trough.

14. The mat of claim 11, wherein said mat is sized so that said mat is short of the rear end of an animal eating from a feed dispenser centered on said mat, so that animal wastes may still fall on the floor.

15. The mat of claim 11, wherein said material is a plastic.

16. The mat of claim 11, wherein said material is high density polyethylene.

17. The mat of claim 11, wherein said material is rubber.

18. The mat of claim 11, wherein said grooves are substantially semi-circular in cross-section.

19. The mat of claim 11, wherein said mat is fastened to a floor.

* * * * *